3,849,452
PROCESS FOR PRODUCING α-ANTHRAQUINONE-
SULFONATES WITH LOW MERCURY CONTENT
Eitaro Hongo and Hirohiko Yamada, Osaka, Yozo Fujii,
 Ashiya, Katsumi Masuda, Osaka-fu, and Junichi Itou
 and Takaaki Nakano, Takarazuka, Japan, assignors to
 Sumitomo Chemical Company, Limited
No Drawing. Filed Mar. 17, 1972, Ser. No. 235,863
  Claims priority, application Japan, Mar. 27, 1971,
          46/18,109
          Int. Cl. C09b 1/00
U.S. Cl. 260—370                              5 Claims

ABSTRACT OF THE DISCLOSURE

Mercury or mercury compounds are removed as mercury sulfide from α-anthraquinone sulfonates contaminated with mercury or mercury compounds which are used as a catalyst, by reacting with a thiosulfate an aqueous solution of the α-anthraquinone sulfonates, whereby α-anthraquinone sulfonates with low mercury content are obtained.

---

The present invention relates to a process for producing α-antraquinone sulfonates with a low contaminative mercury content.

More particularly, the present invention relates to a method for removal and recovery of mercury from the production step or the products of α-anthraquinone sulfonates obtained by using mercury or mercury compounds as a sulfonation catalyst, without lowering the quality and yield.

The α-anthraquinone sulfonates in the present invention include alkali metal salts and ammonium salts of anthraquinone-1,5-disulfonic acid, anthraquinone-1,8-disulfonic acid and anthraquinone 1-sulfonic acid.

It is essential in order to obtain the α-anthraquinone in high yields and economically to use mercury or a mercury compound. Consequently, a measurable amount of mercury is usually contained in the products. For example, U.S. Pat. 2,999,869 describes that the content thereof may be of more than 1% by weight.

Also, as described in U.S. Pat. 2,999,869 and U.S. Pat. 2,900,397, its removal is extremely difficult, since besides mercury contained in the products as in organic salt, some are often combined organically.

On the other hand, since these α-anthraquinone sulfonates are the starting materials for producing anthraquinone derivatives such as aminoanthraquinones, hydroxyanthraquinones, chloroanthraquinones, etc., the mercury contained in the α-anthraquinone sulfonates may either remain in the derivative substances or discharged in the waste liquid upon producing the derivatives. Thus, it is necessary to remove and recover mercury from the production step of the α-anthraquinone sulfonates or from the products.

The heretofore known methods relating to removal of mercury from α-anthraquinone sulfonates are the treatment of a diluted disulfonation liquor containing substantially anthraquinone-1,8-disulfonic acid with copper powder (U.S. Pat. 2,999,869) and the potassium iodide treatment of the aqueous slurry of the potassium salt of anthraquinone-1,8-disulfonic acid (U.S. Pat. 2,900,397) and the treatment of potassium anthraquinone-1,8-disulfonate with an oxidizing agent such as potassium permanganate (U.S. Pat. 3,079,404).

However, since these methods use comparatively expensive substances, the cost of treatment becomes high. Furthermore, since in the case of the treatment with copper powder the copper dissolves out, it is further necessary to treat a waste liquid containing copper. Also, in the cases of the latter two treatments, the mercury removed from the product comes into the waste liquids, and therefore a considerable cost will be required for waste liquid treatment.

The object of the present invention consists in lowering the content of mercury in α-anthraquinone sulfonates without lowering the quality and yield thereof by recovering the mercury as mercury sulfide.

The object of the present invention can be accomplished by reacting with a thiosulfate an aqueous solution of an α-anthraquinone sulfonic acid or a salt thereof contaminated with mercury or a mercury compound which is used as a catalyst in the preparation of an α-anthraquinone sulfonate, to convert the mercury or mercury compounds to mercury sulfide, and removing the resulting precipitates by filtration. Concretely stated, the ratio of removal of mercury from the products by this method is 93%–99.5% by a single treatment.

A manner of practice of the present invention is as follows: Thiosulfate is added to an acidic solution of α-anthraquinone sulfonic acid obtained in the usual way, and reacted therewith at an elevated temperature. Then, the contained mercury is precipitated as mercury sulfide, which is then filtered off. The filtrate is salted out to obtain the salt of an α-anthraquinone sulfonic acid such as an alkali metal salt or ammonium salt.

The thiosulfate treatment step may be placed before the salting out step, while the α-anthraquinone sulfonic acid is still in a state of acid solution. It is one of the most advantageous characteristics of the present invention to require only few additional equipments for the treatment.

Another manner of practice is as follows: A solution of a salt of α-anthraquinone sulfonic acid dissolved in hot water is reacted with thiosulfate in a neutral or acidic state to precipitate the contained mercury as mercury sulfide, which is then filtered off while hot. The salt of α-anthraquinone sulfonic acid is obtained from the filtrate.

In the present invention, since thiosulfate which is a cheap material is used as the treating agent and high-priced mercury is recovered, the cost of treatment is negligible. Further, by the thiosulfate treatment, no lowering in the yield and quality of the products results. Furthermore, a major part of mercury used as the sulfonation catalyst may be removed and recovered as mercury sulfide, and the content of mercury contained in the α-anthraquinone sulfonates or in the filtrates becomes an extremely slight amount. Therefore, by repeating the treatment, the mercury in the waste liquid can be completely removed.

The thiosulfate to be used includes sodium thiosulfate, ammonium thiosulfate, potassium thiosulfate, and calcium thiosulfate.

It is sufficient to use the thiosulfate in an amount of the chemical equivalent or, preferably 3 to 50 times thereof to mercury, represented by the following equation

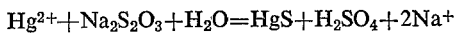

$$Hg^{2+} + Na_2S_2O_3 + H_2O = HgS + H_2SO_4 + 2Na^+$$

The temperature for the thiosulfate treatment may be any temperature at which α-anthraquinone sulfonic acids are dissolved, preferably 80° C. to the reflux temperature. The time required for the thiosulfate treatment depends upon the temperature at which the thiosulfate treatment is effected, but is usually 3 to 10 hours.

The higher the treating temperature is, the shorter the treating time can be. More concretely, three hours or more above 90° C. or five hours or more above 80° C. is preferable.

As apparent from the foregoing explanation, the method of the present invention has made it possible to carry out the removal of mercury from anthraquinone sulfonates with economical and industrial advantages, which has been heretofore considered to be extremely difficult, and thus it is an epoch-making method.

The present invention will be explained concretely with reference to the following examples, but the invention is not limited thereto.

EXAMPLE 1

One thousand parts of a wet cake of anthraquinone-1,5-disulfonic acid (containing 446 parts of anthraquinone-1,5-disulfonic acid, and 520 p.p.m. of mercury) obtained in the usual way was dissolved in 4,000 parts of water. To this solution, 20 parts of sodium thiosulfate $$(NaS_2O_3 \cdot 5H_2O)$$

was added. The solution was heated to react under reflux for three hours. Thereafter, it was cooled to 30° C. and the precipitated mercury sulfide was filtered off. The filtrate was then heated to 90° C. and 750 parts of sodium sulfate was added thereto for salting-out. The precipitated sodium anthraquinone-1,5-disulfonate was filtered off, washed with cold water and dried to obtain 500 parts of sodium anthraquinone-1,5-disulfonate. The purity of the thus obtained sodium anthraquinone-1,5-disulfonate was 95%, and the content of mercury was reduced to $1/15$ in comparison with the case in which the thiosulfate treatment was omitted.

The mercury recovered as mercury sulfide was 86% on the mercury contained in the initial wet cake of anthraquinone-1,5-disulfonic acid. The concentration of mercury in the filtrate from which the product was separated was reduced to 3 p.p.m. by this single treatment.

EXAMPLE 2

To 10,000 parts of a sulfuric acid solution of anthraquinone-1,8-disulfonic acid (containing 746 parts of anthraquinone-1,8-disulfonic acid, and 1280 p.p.m. of mercury) obtained in the usual way, 20,000 parts of water was added. To this solution, 150 parts of sodium thiosulfate ($Na_2S_2O_3 \cdot 5H_2O$) was added. The resulting solution was heated to react under reflux for three hours. Thereafter, the solution was cooled to 30° C. The precipitated mercury sulfide was filtered off. Then, 1350 parts of potassium sulfate was added to the filtrate for salting-out. The precipitated potassium anthraquinone-1,8-disulfonate was filtered off, washed with a 3% potassium sulfate solution, and then dried. The purity of the thus-obtained potassium anthraquinone-1,8-disulfonate was 91%, and the content of mercury became $1/100$ in comparison with the case in which the thiosulfate treatment was omitted. The mercury recovered as mercury sulfide was 99%. The concentration of mercury in the filtrate from which the product was separated was reduced to 3 p.p.m. by this single treatment.

EXAMPLE 3

To 10,000 parts of a solution of anthraquinone-1-sulfonic acid (containing 417 parts of anthraquinone-1-sulfonic acid, and 300 p.p.m. of mercury) obtained in the usual way, 100 parts of sodium thiosulfate was added. The solution was heated to react under reflux for three hours.

Thereafter, the solution was cooled to 30° C. and the precipitated mercury sulfide was filtered off. The filtrate was then heated to 85° C. and 830 parts of a concentrated solution of potassium chloride was added thereto, to precipitate potassium anthraquinone-1-sulfonate. The precipitate was filtered off, washed with a 5% potassium chloride solution, and then dried to obtain 470 parts of potassium anthraquinone-1-sulfonate. Its purity was 93% and the content of mercury became $1/35$ in comparison with the case in which thiosulfate treatment was omitted. The mercury recovered as mercury sulfide was 97%, and the concentration of the mercury in the filtrate from which the product was separated was reduced to 3 p.p.m. by this single treatment.

EXAMPLE 4

To 1,000 parts of sodium anthraquinone-1,5-disulfonate, 12,000 parts of water was added. The mixture was heated to 90° C. so that a uniform solution could be formed. Ten parts of sodium thiosulfate ($Na_2S_2O_3 \cdot 5H_2O$) was then added to the solution to react under reflux for two hours. Thereafter, the solution was cooled to 80° C. and the separated mercury sulfide was filtered off while hot. One thousand parts of sodium sulfate was added to the filtrate, which was then cooled to 30° C. The precipitated sodium anthraquinone-1,5-disulfonate was filtered off, washed with a 10% sodium sulfate, and then dried to obtain 980 parts of sodium anthraquinone-1,5-disulfonate. Its purity was 93% and the content of mercury became $1/15$ in comparison with the case in which the thiosulfate treatment was omitted. The mercury recovered as mercury sulfide was 85%.

What we claim is:

1. A process for producing an α-anthraquinone sulfonate of low mercury content, which comprises reacting a thiosulfate selected from the group consisting of sodium thiosulfate, ammonium thiosulfate, potassium thiosulfate and calcium thiosulfate with an aqueous solution of an α-anthraquinone sulfonic acid or a salt thereof contaminated with mercury or a mercury compound used as catalyst in the preparation of an α-anthraquinone sulfonate, at a temperature of from 80° C. to the reflux temperature to convert the mercury or mercury compound to mercury sulfide, the amount of the thiosulfate being 1 to 50 times the chemical equivalent necessary to react with the mercury or mercury compound, removing the resulting precipitates by filtration and subjecting the filtrate to salting out.

2. The process according to Claim 1 wherein the α-anthraquinone sulfonate is an alkali metal or ammonium salt of anthraquinone-1-sulfonic acid, anthraquinone-1,5-disulfonic acid or anthraquinone-1,8-disulfonic acid.

3. The process according to Claim 1 wherein the amount of the thiosulfate is 3 to 50 times the chemical equivalent.

4. The process according to Claim 1 wherein the reaction is conducted at a temperature permitting dissolution of the α-anthraquinone sulfonic acid or salt thereof.

5. The process according to Claim 1 wherein the reaction is conducted for 3 to 10 hours.

References Cited

FOREIGN PATENTS 128,864   6/1960   Russia _____ 260—370

LORRAINE A. WEINBERGER, Primary Examiner

E. J. SKELLY, Assistant Examiner